United States Patent
Foisy et al.

(10) Patent No.: US 10,386,803 B2
(45) Date of Patent: Aug. 20, 2019

(54) ACCOUNT NUMBER SUBSTITUTION FOR DIAL CAPTURE AND IP BASED COMMUNICATORS

(71) Applicant: Tyco Safety Products Canada Ltd., Concord (CA)

(72) Inventors: Stephane Foisy, Udora (CA); Derek Smith, Maple (CA); Dwayne Richard Salsman, Alliston (CA)

(73) Assignee: Tyco Safety Products Canada Ltd., Concord (CA)

( * ) Notice: Subject to any disclaimer, the term of this patent is extended or adjusted under 35 U.S.C. 154(b) by 0 days.

(21) Appl. No.: 15/909,625

(22) Filed: Mar. 1, 2018

(65) Prior Publication Data

US 2019/0027019 A1   Jan. 24, 2019

Related U.S. Application Data

(60) Provisional application No. 62/536,166, filed on Jul. 24, 2017.

(51) Int. Cl.
| | |
|---|---|
| *G05B 15/02* | (2006.01) |
| *G08B 29/12* | (2006.01) |
| *H04L 9/08* | (2006.01) |
| *H04L 29/06* | (2006.01) |
| *H04L 29/12* | (2006.01) |
| *G08B 17/00* | (2006.01) |

(52) U.S. Cl.
CPC ............ *G05B 15/02* (2013.01); *G08B 29/12* (2013.01); *H04L 9/0838* (2013.01); *H04L 9/0869* (2013.01); *H04L 63/0428* (2013.01); *H04L 63/18* (2013.01); *G05B 2219/2642* (2013.01); *G08B 17/00* (2013.01); *H04L 61/6022* (2013.01)

(58) Field of Classification Search
CPC ...................................................... G08B 29/12
USPC ........................................................ 340/506
See application file for complete search history.

(56) References Cited

U.S. PATENT DOCUMENTS

| | | | |
|---|---|---|---|
| 2007/0290830 A1* | 12/2007 | Gurley ............... | G08B 13/1968 340/506 |
| 2012/0121073 A1* | 5/2012 | Glass ..................... | G08B 25/08 379/39 |
| 2012/0250834 A1* | 10/2012 | Smith ................... | H04M 11/04 379/45 |

(Continued)

*Primary Examiner* — Kerri L McNally
(74) *Attorney, Agent, or Firm* — Arent Fox LLP

(57) ABSTRACT

A system and method for providing account number substitution for dial capture and IP based communicators (panel communicators) is disclosed. The system processes alarm information sent from building management systems such as fire alarm systems and security systems. In the system, control panels of the building management systems are located at one or more premises, and provide raw signals which include the alarm information and account numbers for identifying the control panels. A station receiver installed at a monitoring station provides site account numbers for the account numbers of the control panels. In an embodiment, panel communicators at the premises enable communications between legacy control panels having telephony interfaces and the station receiver. The monitoring station then uses the site account numbers to identify the premises at which each control panel is installed for responding to the alarm information sent from the control panels.

21 Claims, 4 Drawing Sheets

(56) References Cited

U.S. PATENT DOCUMENTS

2013/0076510 A1\* 3/2013 Bear ................... G08B 25/009
　　　　　　　　　　　　　　　　　　340/539.16

\* cited by examiner

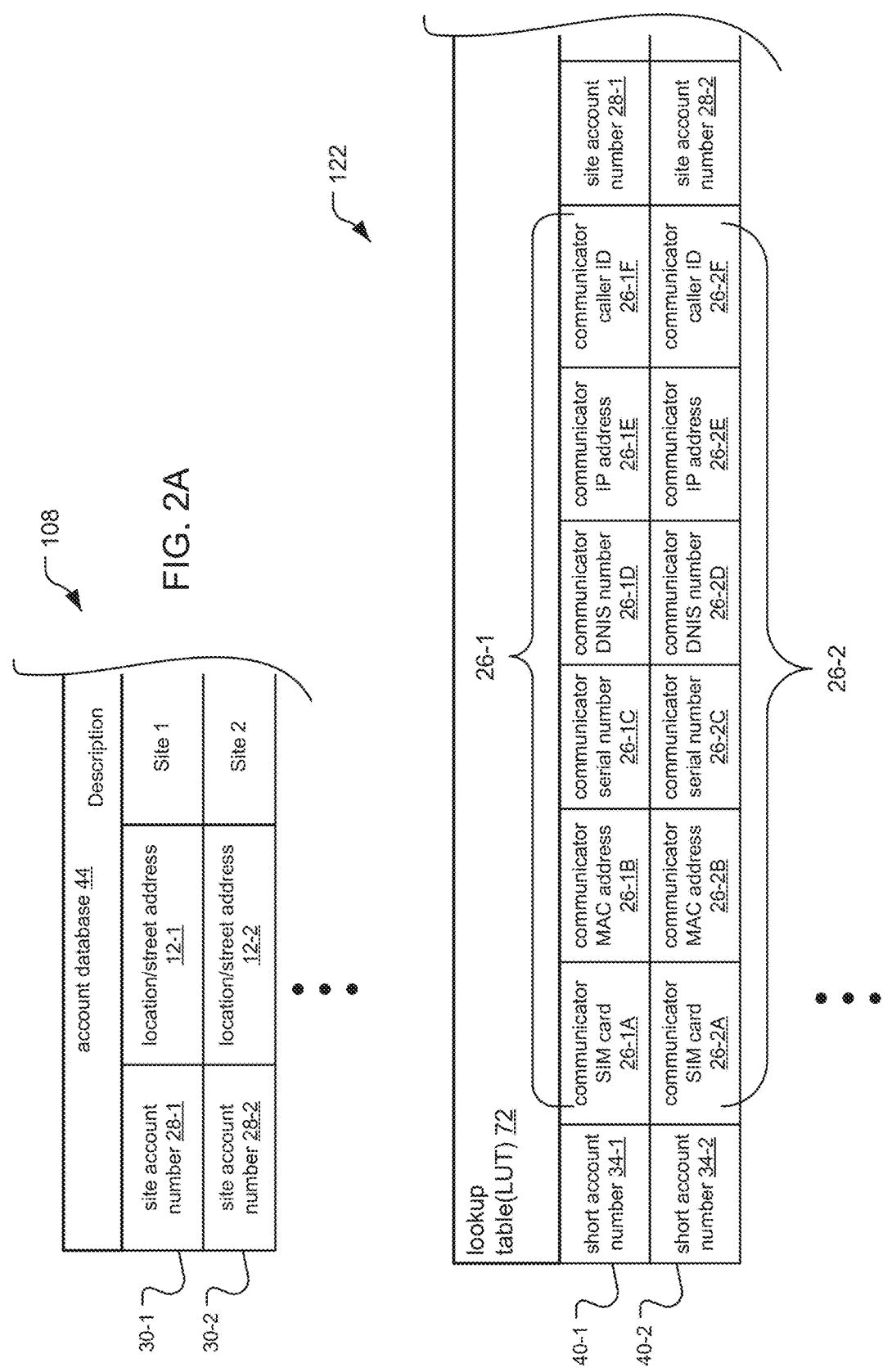

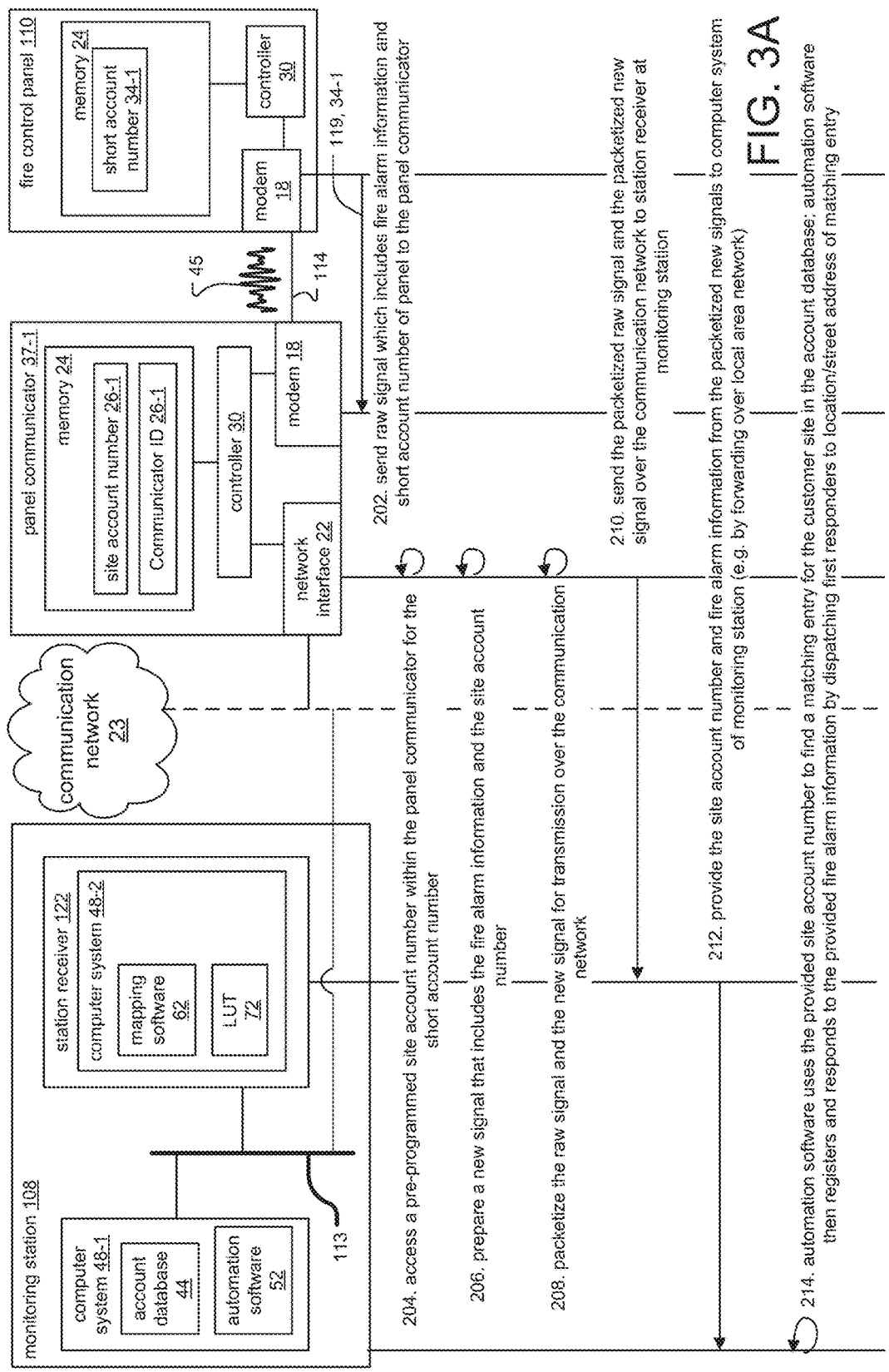

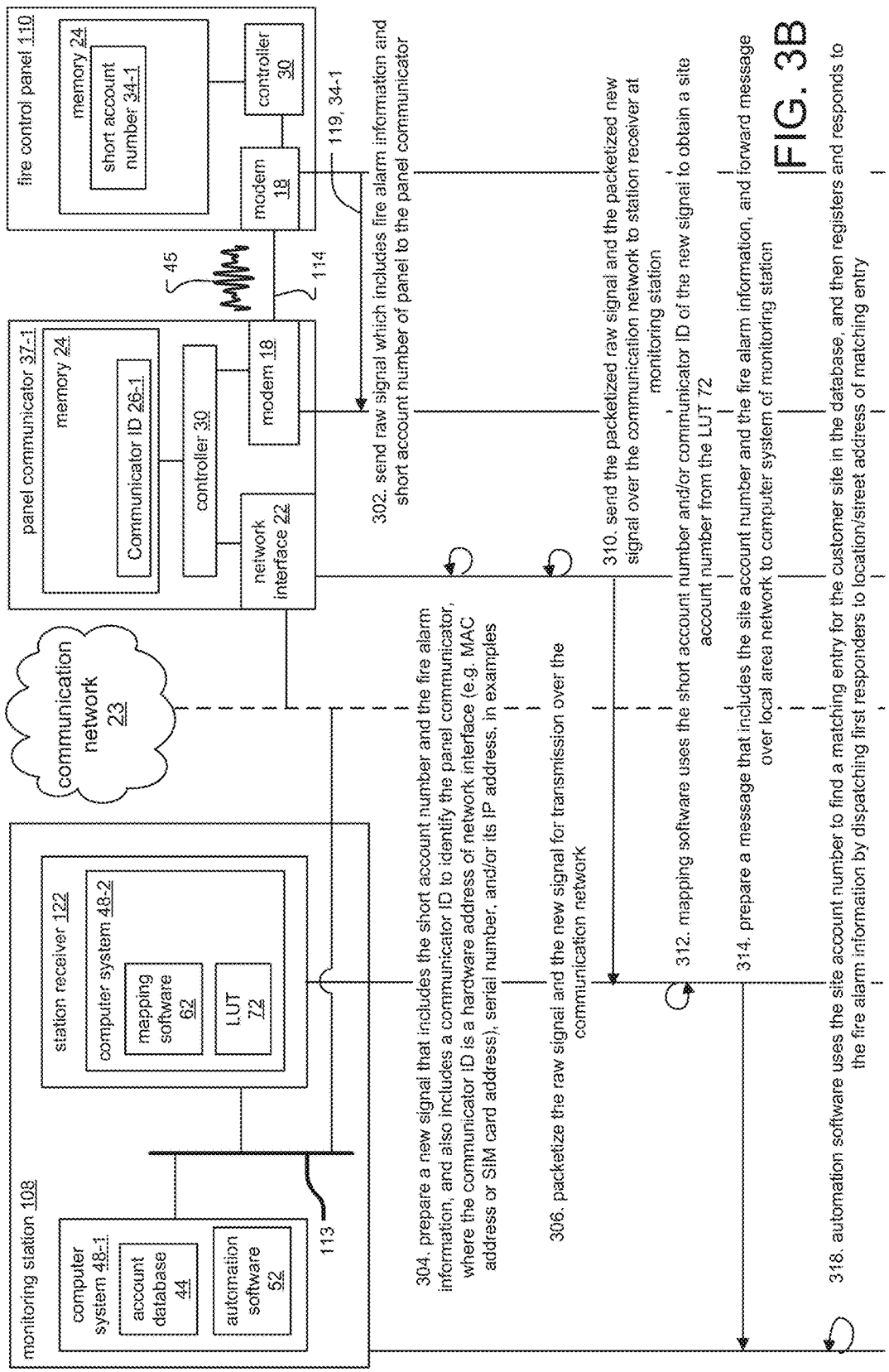

ACCOUNT NUMBER SUBSTITUTION FOR DIAL CAPTURE AND IP BASED COMMUNICATORS

RELATED APPLICATIONS

This application claims the benefit under 35 USC 119(e) of U.S. Provisional Application No. 62/536,166 filed on Jul. 24, 2017, which is incorporated herein by reference in its entirety.

BACKGROUND OF THE INVENTION

Building management systems such as fire alarm systems and security systems are often installed within a premises such as commercial, residential, or governmental building. Examples of these buildings include offices, hospitals, warehouses, multi-unit dwellings, schools or universities, shopping malls, government offices, and casinos. These systems generally include control panels that function as system controllers and distributed devices.

For example, the fire alarm systems typically include fire control panels that function as the system controllers. Fire detection/initiation devices and alarm notification devices are then installed throughout the buildings and connect to the panels. These devices communicate over a local circuit such as a safety and security network, which in turn connects to the fire control panel. Some examples of fire detection/initiation devices include smoke detectors, carbon monoxide detectors, flame detectors, temperature sensors, and/or pull stations (also known as manual call points). Some examples of fire notification devices include speakers, horns, bells, chimes, light emitting diode (LED) reader boards, and/or flashing lights (e.g., strobes).

The fire detection devices monitor the buildings for indicators of fire. Upon detection of an indicator of fire such as smoke or heat or flames, the device is activated and a signal is sent from the activated device over the safety and security network to the fire control panel. The fire control panel then initiates an alarm condition by activating audio and visible alarms of the fire notification devices. Additionally, the fire control panel will also send the indications of fire as fire alarm information to a monitoring station, which will notify the local fire department or fire brigade.

In a similar vein, the security systems typically include security panels and monitoring devices, where the monitoring devices detect indications of intrusions and unauthorized access at or within the building and report to the security panel. The monitoring devices of the security systems often include motion sensor devices, surveillance camera devices, and door controllers that communicate with the intrusion panel over a safety and security network and might also control the door locking/unlocking. Motion sensor devices can detect intrusions and unauthorized access to the premises, and send indications of the intrusions to the security panel. The surveillance camera devices capture video data of monitored areas within the premises, and door controllers provide access to perimeter and/or internal doors, in examples. Additionally, the security panel will also send the indications of intrusions as intrusion information to a monitoring station.

The monitoring stations will typically monitor multiple fire alarm and security systems for alarm information sent from the control panels of these systems. The alarm information includes fire alarm information sent from the fire alarm panels and intrusion information sent from the security panels. The monitoring stations process the alarm information and then notify the proper authorities. Monitoring stations are often required by regulations, making them a standard component of most fire alarm and security systems, regardless of age or manufacturer of the components of these systems. These monitoring stations can be administered by a third party company, the same company that provides or manufactures the fire alarm systems and security systems, or a public agency, among examples.

SUMMARY OF THE INVENTION

Many fire control panels and security panels installed are considered legacy control panels. These legacy control panels are dialup control panels that were originally designed to communicate with the monitoring station using telephone lines, for example. When an alarm or security event is detected at a premises, a modem of the control panels would exchange tones with the monitoring station to establish a call session with the monitoring station. The control panel then provides the alarm information for transmission over the call session to the monitoring station. The control panels also usually provide an account number so that the monitoring stations can determine which panels (and thus which customer sites) sent the alarm information.

These legacy panels also typically have limited computing and storage resources. The computing resources are limited because the legacy panels are typically embedded systems that are based on early microcontroller designs. Because of their age, the stored account numbers are often short, represented by a fixed number of digits, typically as few as four digits.

Building owners that still have legacy panels installed at their customer sites usually do not want to replace these panels. This not only maximizes the investment in these panels, but also reduces risks associated with installing new panels. These risks include potential incompatibility of existing sensor devices with the new panels, reprogramming risk, limited customer knowledge of newer technologies provided by the panels, and disruption of the services that the currently installed legacy panels provide.

Increasingly, the monitoring stations are supporting more modern internet protocol (IP) based communications over communications networks. These communications networks include cellular networks, Ethernet local area networks, and wide area networks, in examples. In this way, these modern monitoring stations can support modern control panels that support IP-based communications as well as legacy control panels. Another follow-up effect of these changes is the fact that monitoring stations are becoming much larger in terms of the number of buildings that they monitor.

While many monitoring stations still support telephone lines, telephone lines are in decline. This poses a problem for customers with legacy control panels when the monitoring stations no longer support telephone lines. Fortunately, control panel manufacturers have anticipated this problem and have solved it by installing panel communicators at customers sites having legacy control panels.

Panel communicators allow legacy control panels to transmit alarm information to monitoring stations over communications networks such as IP-based networks, rather than just over telephone lines. These panel communicators are often dial capture devices that operate as a gateway between the legacy control panels and the communication networks. Typically, each control panel is wired to an individual panel communicator at the customer premises. The panel communicators are wired directly to the control panels' standard telephone ports, and also have a network interface that enables communications with the communications networks. The panel communicators receive the alarm information from the control panels, and reformat the captured alarm information into a format more suitable for transmission over the communications networks (e.g. in a packetized format).

The use of panel communicators at the control panels can help the monitoring stations to support many more control panels than the monitoring stations could without use of the panel communicators. Tens of thousands of control panels can be supported by one monitoring station, and possibly many more. Moreover, modern monitoring stations that use panel communicators can support legacy control panels, in addition to supporting modern IP-based control panels.

However, the use of panel communicators has created other issues at monitoring stations. First, as the number of legacy control panels supported by the monitoring stations has increased, so has the likelihood for receiving duplicate short account numbers provided by the legacy control panels in conjunction with the alarm information. When this occurs, there is typically no additional information provided by the legacy control panels that could be used to determine which control panels sent which alarm information. Second, some older legacy control panels transmit the alarm information in a format which the modern monitoring stations may not support. These issues can cause false alarms, failure to dispatch first responders to a customer site in response to alarm information, and/or cause responders to be dispatched to the wrong customer site, in examples.

Some solutions have been proposed to resolve these issues, but each has drawbacks. One solution to address duplicate account numbers provided from different control panels is to change the programming of the panels. However, this solution is often not possible due to unknown installer codes, the installer not being on site, or the inability to change the programming of the panels, especially in legacy panels. Another solution is to force a reprogramming of the account number of the panel at the panel communicator. However, this requires extra processing power at each communicator, the ability to support remote programming at each communicator and to provide future access to the programming, and takes additional time.

The proposed system can resolve issues associated with processing alarm information sent from building management systems having legacy control panels. In the proposed system, a station receiver preferably installed at the monitoring station provides the alarm information sent from each legacy control panel to the monitoring station. The station receiver also provides site account numbers for the short account numbers of the control panels to the monitoring station. The monitoring station then uses the site account numbers to identify the premises at which each control panel is installed for responding to the alarm information sent from the control panels.

In one implementation, the panel communicators provide the site account numbers to the station receiver. For this purpose, each panel communicator stores a site account number for the control panel to which each panel communicator is wired, and provides the site account number to the station receiver in place of the short account number.

In another implementation, each panel communicator provides a communicator ID to the station receiver at the monitoring station. The communicator ID identifies the panel communicator to the station receiver. The station receiver then uses the communicator ID to obtain the site account number for the short account number of the control panel to which the panel communicator is wired.

The proposed system can also resolve issues associated with processing alarm information sent from building management systems having more modern control panels. Because modern monitoring systems can support both legacy control panels and many more modern IP-based control panels, there is also the likelihood of a duplicate account number being provided by the control panels. Here, the modern control panels communicate directly with the station receiver via a communications network. The modern control panels can provide unique network identifiers (MAC addresses, IP addresses, global positioning coordinates of the control panels, in examples) that identify the control panels to the station receiver. The station receiver can then use the network identifiers to obtain site account numbers for the control panels.

In general, according to one aspect, the invention features a system for processing alarm information sent from building management systems. The system includes control panels at one or more premises, and a station receiver installed at a monitoring station. The control panels provide raw signals which include the alarm information and account numbers for identifying the control panels. The station receiver provides site account numbers for the account numbers of the control panels, and the monitoring station uses the site account numbers to identify the premises at which each control panel is installed for responding to the alarm information sent from the control panels.

Typically, the system also includes panel communicators located at the one or more premises that are in communication with the control panels. These panel communicators receive the raw signals sent from the control panels. The panel communicators provide the site account numbers and the alarm information to the station receiver in new versions of the raw signals.

In one implementation, the panel communicators provide the site account numbers and the alarm information to the station receiver at the monitoring station.

In another implementation, the panel communicators provide communicator IDs which identify the panel communicators to the station receiver. The station receiver then uses the communicator IDs to obtain the site account numbers for the account numbers of the control panels. In examples, the communicator IDs are media access control (MAC) addresses, IP addresses, and/or serial numbers of the panel communicators.

Typically, the panel communicators provide the communicator IDs to the station receiver in new versions of the raw signals.

At the station receiver, in one implementation, the communicator IDs are used to obtain the site account numbers for the account numbers of the control panels by executing a lookup of the communicator IDs against a lookup table at the station receiver to obtain the site account numbers.

The monitoring station and the station receiver communicate with one another and are in communication with a communications network.

In another implementation, the control panels are in communication with the station receiver and provide network identifiers which identify the control panels to the station receiver. Here, the station receiver uses the network identifiers to obtain the site account numbers for the account numbers of the control panels. Examples of network identifiers include MAC addresses, IP addresses, and/or subscriber identification module (SIM) numbers of the control panels.

In general, according to another aspect, the invention features a method for processing alarm information sent from building management systems. In the method, control panels at one or more premises provide raw signals which include the alarm information and include account numbers for identifying the control panels. A station receiver installed at a monitoring station also provides site account numbers for the account numbers of the control panels. The monitoring station then uses the site account numbers to identify the premises at which each control panel is installed for responding to the alarm information sent from the control panels.

In one example, the station receiver provides site account numbers for the account numbers of the control panels in response to the station receiver receiving network identifiers from the control panels, the network identifiers identifying the control panels, and the station receiver using the network identifiers to obtain the site account numbers for the account numbers of the control panels. The station receiver might use the communicator IDs to obtain the site account numbers for the account numbers of the control panels in a dynamic fashion or based upon a programmed translation.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 2A is a block diagram showing an implementation of an account database maintained by the monitoring station, and FIG. 2B is a block diagram showing detail for the lookup table 72 within computer system 48-2 of the station receiver 122;

FIG. 3A is a sequence diagram that describes how a panel communicator at a customer site provides a site account number for the short account number of a legacy fire control panel, where the panel communicator then provides the site account number to a station receiver at the monitoring station, according to an embodiment; and FIG. 3B is a sequence diagram that describes how the station receiver provides a site account number to the monitoring station for a legacy fire control panel, according to another embodiment, where the station receiver uses a communicator ID provided by the panel communicator to obtain the site account number for the legacy fire control panel.

DETAILED DESCRIPTION OF THE PREFERRED EMBODIMENTS

Figure 1:
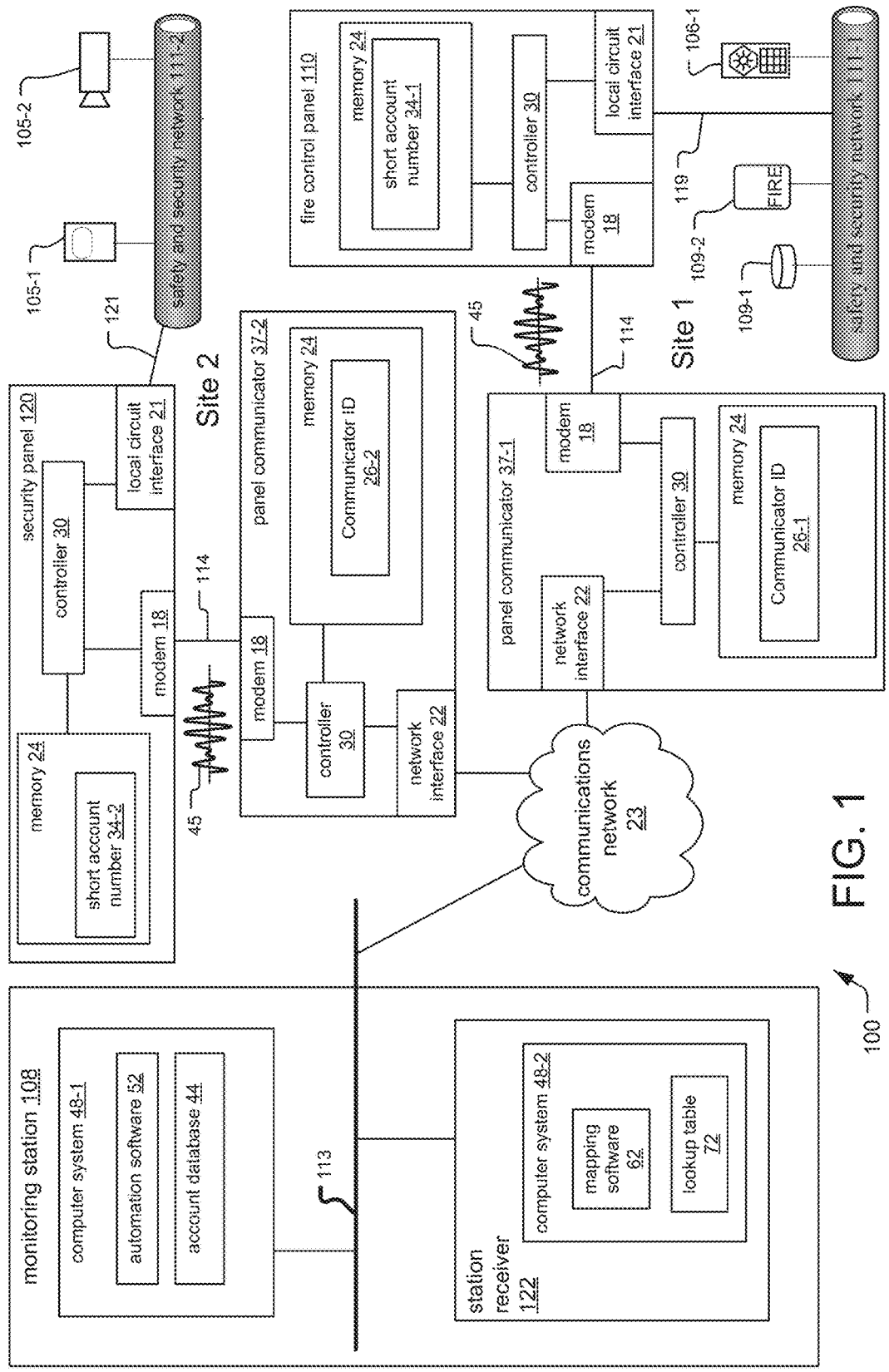
FIG. 1 is a block diagram of a monitoring station that communicates with legacy control panels of various building management systems using panel communicators, where the monitoring station monitors the panels and responds to alarm information sent from the panels.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 shows a monitoring station 108 that is in communication with control panels of various building management systems 100. The monitoring station 108 monitors the control panels, and responds to alarm information sent from the control panels.

In the illustrated example, a security panel 120, and a fire control panel 110 are shown as different examples of building control panels installed at different customer premises. The control panels provide raw signals which include alarm information sent from the control panels, and which include account numbers for identifying the control panels 110,120.

In a preferred embodiment, a station receiver 122 is installed at the monitoring station 108 and communicates with a computer system 48-1 of the monitoring station 108 over a local area network 113. The local area network 113 is also connected to a communications network 23.

The station receiver 122 provides site account numbers for the account numbers of the control panels, and the monitoring station 108 uses the site account numbers to identify the premises at which each control panel is installed for responding to the alarm information sent from the control panels.

Fire control panel 110 and security control panel 120 are legacy control panels that are connected to panel communicators 37-1, 37-2, respectively. The control panels 110, 120 are installed at different customer sites Site 1 and Site 2, respectively. The panel communicators 37 also communicate with communications network 23.

The control panels 110,120 each provide "raw" signals that include a short account number 34-1, 34-2 for identifying the control panels and include alarm information. The panel communicators 37, in turn, receive the account numbers 34 and the alarm information sent from the control panels 110,120.

Then, the station receiver 122 or the panel communicators 37 provide site account numbers for the account numbers 34 of the control panels 110, 120. The monitoring station 108 then uses the site account numbers to identify the premises at which each control panel 110,120 is installed for responding to the alarm information sent from each of the control panels 110,120.

In more detail, fire control panel 110 includes a controller 30, memory 24, a modem 18, and a local circuit interface 21. The fire control panel 110 stores its short account number 34-1 within memory 24. The controller 30 controls the modem 18 and the local circuit interface 21, and accesses the memory 24.

To illustrate specific implementation details, fire control panel 110, for example, is shown connected to safety and security network 111-1. Fire detection/initiation devices 109 on the safety and security network 111-1 detect indications of fire, and send fire alarm information 119 as an example of alarm information sent to fire control panel 110. Fire detection/initiation devices 109 such as smoke detector 109-1 and pull station 109-2 are shown. Upon detecting the indications of fire, the fire detection/initiation devices 109 also signal alarm notification devices 106 such as strobe 106-1.

One exemplary panel communicator 37-1 is wired to a telephone port of fire control panel 110. A twisted pair connection 114 replaces the telephone line to which the fire control panel 110 usually connects. The twisted pair connection 114 connects modem 18 of the panel communicator 37-1 to modem 18 of fire control panel 110.

To enable communications with the fire control panel 110, this panel communicator 37-1 sends a dial tone 45 over the twisted pair connection 114 to the panel communicator 37-1. The fire control panel 110 can then provide its short account number 34-1 along with fire alarm information 119 as encoded audio signals over the twisted pair connection 114 to the panel communicator 37-1. One exemplary audio encoding scheme is dual tone multi-frequency (DTMF) encoding, but many other audio encoding schemes are possible.

The panel communicator 37-1 includes various components and also connects to communications network 23. The components include a controller 30, memory 24, a modem 18, memory 24, and a network interface 22. The communicator 37-1 connects to the communications network 23 via network interface 22. A communicator ID 26-1 is stored in memory 24.

The communicator ID 26-1 is an identifier that is specific to the communicator 37-1 and which identifies the communicator 37-1. The communicator ID 26-1 can take many different forms. In one example, the communicator ID 26-1 is an internet protocol (IP) address assigned to the network interface 22 of the panel communicator 37-1. More examples of communicator IDs 26 are disclosed in the description that accompanies FIG. 2B, included herein below.

Also, in more detail, security panel 120 includes a controller 30, memory 24, a modem 18, and a local circuit interface 21. The security panel 120 stores its short account number 34-2 within memory 24. The controller 30 controls the modem 18 and the local circuit interface 21, and accesses the memory 24.

To illustrate further specific implementation details, security panel 120, for example, is shown connected to safety and security network 111-2. Monitoring devices 105 on the safety and security network 111-2 detect intrusions, and send intrusion information 121 as an example of alarm information sent to security panel 120. Monitoring devices 105 such as motion sensor 105-1 and surveillance camera 105-2 are shown.

Panel communicator 37-2 is wired to a telephone port of security panel 120. A twisted pair connection 114 replaces the telephone line to which the security panel 120 usually connects. The twisted pair connection 114 connects modem 18 of the panel communicator 37-2 to modem 18 of security panel 120.

To enable communications with the security panel 120, the panel communicator 37-2 sends a dial tone 45 over the twisted pair connection 114 to the panel communicator 37-2. The security panel 120 can then provide its short account number 34-2 along with the intrusion information 121 as encoded audio signals over the twisted pair connection 114 to the panel communicator 37-2.

Panel communicator 37-2 includes various components and also connects to communications network 23. The components include a controller 30, memory 24, a modem 18, and a network interface 22. The communicator 37-2 connects to the communications network 23 via network interface 22. A communicator ID 26-2 is stored in memory 24.

A computer system 48-1 of the monitoring station 108 communicates with the station receiver 122 over local area network 113. The computer system 48-1 has a processor such as a central processing unit (CPU), and includes automation software 52 and an account database 44. Computer system 48-1 of the monitoring station 108 is generally a high availability system. It is typically dedicated to the tasks of identifying the customer sites from which the alarm information is sent, and dispatching first responders to the customer sites to respond to the alarm information.

The station receiver 122 installed at the monitoring station 108 includes computer system 48-2. Computer system 48-2 has a processor such as a CPU, and includes mapping software 62 and a lookup table (LUT) 72. The installation of the station receiver 122 at the monitoring station 108 enhances the capabilities of the monitoring station 108, without the need to modify computer system 48-1 or impact its ability to process alarm information and dispatch first responders to customer sites.

FIG. 2A shows detail for the account database 44 within computer system 48-1 of the monitoring station 108. The automation software 52 executing upon computer system 48-1 of the monitoring station 108 manages the account database 44.

The account database 44 includes entries 30 for each customer site. Entries 30-1 and 30-2 for customer sites Site 1 and Site 2 are shown. Each entry 30 typically includes at least the site account number 28, and a location/street address 12. The site account number 28 is unique to each customer site. This number is typically longer than could be programmed into any of the legacy control panels. The street address is used for billing information, and is the physical address to which first responders will be dispatched in response to the alarm information sent from the control panels. An additional description field is also shown.

In more detail, entry 30-1 includes site account number 28-1, location/street address 12-1, and description "Site 1." In a similar vein, entry 30-2 includes site account number 28-2, location/street address 12-2, and description "Site 2."

FIG. 2B shows detail for the lookup table 72 within computer system 48-2 of the station receiver 122.

The lookup table 72 includes entries 40 for each customer site (and thus for each control panel). Entries 40-1 and 40-2 for customer sites Site 1 and Site 2 are shown. Each entry 40 typically includes at least the short account number 34 of/provided by a legacy control panel, one or more communicator IDs 26 of a panel communicator 37 to which each legacy control panel connects, and a site account number 28. The site account numbers 28 in the lookup table 72 are programmed to be the same as the site account numbers 28 in the account database 44.

In more detail, entry 40-1 includes short account number 34-1, site account number 28-1, and different types of communicator IDs 26-1. In examples, the communicator IDs 26-1 include hardware addresses of different communications networks 23 to which the panel communicators 37 might connect, and other information programmed/stored within the panel communicators 37 that can be used to identify the panel communicators. The following exemplary types of communicator IDs 26-1 are shown: communicator SIM card 26-1A; communicator MAC address 26-1B; communicator serial number 26-1C; communicator dialed number identification service (DNIS) number 26-1D; communicator IP address 26-1E; and communicator caller ID 26-1F.

Other types of communicator IDs 26 might include global positioning system (GPS) coordinates, international mobile equipment identity numbers (IMEI), or other numbers.

In a similar vein, entry 40-2 includes short account number 34-2, site account number 28-2, and different types of communicator IDs 26-2. The following types of communicator IDs 26-2 are shown: communicator SIM card 26-2A; communicator MAC address 26-2B; communicator serial number 26-2C; communicator DNIS number 26-2D; communicator IP address 26-2E; and communicator caller ID 26-2F.

FIG. 3A shows an embodiment of the proposed system for processing fire alarm information 119 sent from an exemplary legacy fire control panel 110.

Panel communicator 37-1 provides a site account number 28-1 for the account number 34-1 of the control panel 110 to the station receiver 122. The site account number 28-1 provided by the panel communicator 37-1 operates as a substitute account number for the fire control panel's account number 34-1.

In step 202, fire control panel 110 sends a raw signal such as an audio signal over the twisted pair connection 114 to the panel communicator 37-1. The raw signal includes the short account number 34-1 of the fire control panel 110, and also includes fire alarm information 119 sent from the fire control panel 110. In one example, the format that the fire control panel 110 uses to encode the alarm information 119 and short account number 34-1 is a "raw" audio format.

In step 204, panel communicator 37-1 accesses a pre-programmed site account number 26-1 within the panel communicator for the short account number 34-1. Here, the site account number 26-1 is programmed at the panel communicator 37-1 to be the site account number 28-1 of record maintained within the account database 44 for the customer site at which the panel communicator 37-1/fire control panel 110 are installed.

The translation of the control panel short account number 34 into a site account number 28 by the panel communicator 37 can be performed by profile, manually, by option, by account range, and/or by event, in examples. This allows the automation software 52 of the monitoring station 108 to handle the processing of alarm information of a given customer account while avoiding duplication or multiple account numbers for separate streams of data, i.e., one account number for one panel, one for the station receiver 122.

Then, in step 206, the panel communicator 37-1 prepares a new signal that includes the fire alarm information 119 and the site account number 26-1.

According to step 208, the panel communicator 37-1 packetizes the raw signal and the new signal for transmission over the communications network 23. The panel communicator 37-1 sends the packetized raw signal and the packetized new signal to the station receiver in step 210. The signals are packetized according to the specific networking technology of the communications network 23.

According to step 212, the station receiver 122 provides the site account number and the fire alarm information 119 from the packetized new signal to the computer system 48-1 of the monitoring station 108, such as by forwarding over the local area network 113. The computer system 48-2 and mapping software 62 of the station receiver 122 can also provide any necessary reformatting, conversion, or translation of the fire alarm information 119 prior to sending the fire alarm information 119 to the computer system 48-1 of the monitoring station 108. For the format conversion, the station receiver 122 knows the format of the alarm information 119 based upon the origin (e.g. customer site) of the raw signals/new signals and will convert any signal not from the same origin to the desired format. This allows the fire alarm information 119 to be consistently represented at the monitoring station 108, which eliminates confusion for handling of the fire alarm information 119 by operators and/or the automation software 52.

Alternatively, the station receiver 122 might send the packetized new signal directly to the computer system 48-1 of the monitoring station 108.

Other advantages for the station receiver 122 to receive the fire alarm information 119 before forwarding the fire alarm information 119 to the computer system 48-1 of monitoring station 108 are as follows. One advantage is that the station receiver 122 (specifically, the computer system 48-2 of the station receiver 122) often has greater processing power and memory than the computer system 48-1 of the monitoring station 108. Yet another advantage is that the station receiver 122 provides the site account number 28-1 that is required/expected by the monitoring station 108, while maintaining the timing of the communications streams over which the fire alarm information 119 are sent.

In step 214, automation software 52 executing upon computer system 48-1 of the monitoring station 108 uses the provided site account number 28-1 to find a matching entry for the customer site in the account database 44. The automation software 52 then registers and responds to the fire alarm information 119 by dispatching first responders to the location/street address 12-1 of the matching entry 30-1.

In another implementation, the station receiver 122 might send both the raw signals and the new signals to the computer system 48-1. The automation software 52 then can compare the fire alarm information 119 of the raw signals against the fire alarm information 119 of the new signals. With both the original raw signal and the new signal at the monitoring station 108, potential mistakes/differences in the fire alarm information 119 can be reviewed quickly without the need to send a technician to the customer site to ascertain problems.

FIG. 3B shows another embodiment of the proposed system for processing fire alarm information 119 sent from a legacy fire control panel 110. Here, the panel communicator 37-1 provides a communicator ID 26-1 to the station receiver 122. The station receiver 122 then obtains a site account number 28-1 for the account number 34-1 of the fire control panel 110, using the provided communicator ID

26-1. The site account number 28-1 obtained by the station receiver 122 operates as a substitute account number for the fire control panel's account number 34-1.

In step 302, fire control panel 110 sends a raw signal over the twisted pair connection 114 to the panel communicator 37-1. The raw signal includes the short account number 34-1 and the fire alarm information 119, encoded in a "raw" audio format.

Then, in step 304, the panel communicator 37-1 prepares a new signal that includes the short account number 34-1 and also includes a communicator ID 26-1 that identifies the panel communicator 37-1. Examples of the communicator ID 26-1 were disclosed in the description that accompanies FIG. 2B, included herein above.

According to step 306, the panel communicator 37-1 packetizes the raw signal and the new signal for transmission over the communications network 23. The panel communicator 37-1 sends the packetized new signal to the station receiver 122 in step 310. Optionally, the panel communicator 37-1 might also send the packetized raw signal to the station receiver 122. The station receiver 122 can then perform any format conversion of the fire alarm information 119, if required, for consumption by the computer system 48-1 of monitoring station 108.

In step 312, mapping software 62 executing on computer system 48-2 uses the communicator ID 26-1 and possibly the short account number 34-1 of the new signal to obtain a site account number 28-1 from the LUT 72 for the short account number 34-1.

The translation of the communicator ID 26-1 into a site account number 28 by the mapping software 62 can be performed by profile, manually, by option, by account range, and/or by event, in examples. This allows the automation software 52 of the monitoring station 108 to handle the processing of alarm information such as fire alarm information 119 of one customer account, while also avoiding duplication or multiple account numbers for separate streams of data, i.e., one account number for panel, one for the station receiver 122.

According to step 314, the station receiver 122 then prepares a message that includes the fire alarm information 119, and also includes the site account number 28-1 obtained from the LUT 72. The station receiver 122 sends the message over local area network 113 to the computer system 48-1 of the monitoring station 108.

In step 318, automation software 52 executing upon a processor of computer system 48-1 uses the site account number 28-1 to find a matching entry for the customer site in the account database 44. The automation software 52 then registers and responds to the fire alarm information 119 by dispatching first responders to the location/street address 12-1 of the matching entry 30-1.

In another embodiment, the control panels are modern control panels that communicate directly with the station receiver 122 via the communications network 23. Here, no panel communicators 37 are located between the control panels and the station receiver 122.

In more detail, the control panels provide one or more network identifiers which identify the control panels to the station receiver 122. The station receiver 122 then uses the network identifiers to obtain the site account numbers 28 for the account numbers 34 of the control panels. The network identifiers are substantially similar to the types of hardware addresses disclosed for communicator IDs 26 in FIG. 2B, included herein above. For example, the network identifiers might be SIM, IP address, and MAC address network identifiers.

In implementations, the station receiver 122 might obtain the site account number 28 from the network identifiers dynamically, or based on a programmed translation. The programmed translation, in one example, is accomplished by executing a lookup of the network identifier in the LUT 72 to obtain the associated site account number 28.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for processing alarm information sent from a building management system, comprising:
   a control panel at a premises, wherein the control panel stores an account number for identifying the control panel, wherein the control panel provides raw signals which include the alarm information and the account number; and
   a station receiver installed at a monitoring station, wherein the station receiver provides a site account number associated with the account number of the control panel, wherein the site account number is longer than could be programmed into the control panel, wherein the monitoring station uses the site account number to identify the premises at which the control panel is installed for responding to the alarm information sent from the control panel.

2. The system of claim 1, further comprising a panel communicator located at the premises and in communication with the control panel, wherein the panel communicator receives the raw signals sent from the control panel.

3. The system of claim 2, wherein the panel communicator provides the site account number and the alarm information to the station receiver at the monitoring station.

4. The system of claim 2, wherein the panel communicator provides the site account number and the alarm information to the station receiver in a new version of the raw signals.

5. The system of claim 2, wherein the panel communicator provides a communicator identifier (ID) which identifies the panel communicator to the station receiver, and wherein the station receiver uses the communicator ID to obtain the site account number associated with the account number of the control panel.

6. The system of claim 5, wherein the communicator ID comprises a media access control (MAC) address of the panel communicator.

7. The system of claim 5, wherein the communicator ID comprises an Internet protocol (IP) address of the panel communicator.

8. The system of claim 5, wherein the communicator ID comprises a serial number of the panel communicator.

9. The system of claim 5, wherein the panel communicator provides the communicator ID to the station receiver in a new version of the raw signals.

10. The system of claim 5, wherein the station receiver uses the communicator ID to obtain the site account number associated with the account number of the control panel by executing a lookup of the communicator ID against a lookup table at the station receiver to obtain the site account number.

11. The system of claim 1, wherein the monitoring station and the station receiver communicate with one another and are in communication with a communications network.

12. The system of claim 1, wherein the control panel is in communication with the station receiver and provides a network identifier (ID) which identifies the control panel to the station receiver, and wherein the station receiver uses the network ID to obtain the site account number associated with the account number of the control panel.

13. The system of claim 12, wherein the network ID comprises a media access control (MAC) of the control panel.

14. The system of claim 12, wherein the network ID comprises an Internet protocol (IP) address of the control panel.

15. The system of claim 12, wherein the network ID comprises a subscriber identification module (SIM) number of the control panel.

16. A method for processing alarm information sent from a building management system, comprising:
  providing raw signals by a control panel at a premises, wherein the control panel stores an account number for identifying the control panel, wherein the raw signals include the alarm information and the account number;
  providing a site account number by a station receiver installed at a monitoring station, the site account number being associated with the account number of the control panel, the site account number being longer than could be programmed into the control panel; and
  using the site account number by the monitoring station to identify the premises at which the control panel is installed for responding to the alarm information sent from the control panel.

17. The method of claim 16, further comprising:
receiving the raw signals from the control panel by a panel communicator located at the premises.

18. The method of claim 17, further comprising:
providing, by the panel communicator, the site account number associated with the account number of the control panel to the station receiver.

19. The method of claim 17, further comprising:
providing, by the panel communicator, a communicator identifier (ID) to the station receiver, the communicator ID identifying the panel communicator; and
using the communicator ID by the station receiver to obtain the site account number associated with the account number of the control panel.

20. The method of claim 16, further comprising:
providing, by the control panel, a network identifier (ID) to the station receiver, the network ID identifying the control panel; and
using, by the station receiver, the network ID to obtain the site account number associated with the account number of the control panel.

21. The method of claim 20, wherein the station receiver uses the network ID to obtain the site account number dynamically or based upon a programmed translation.

* * * * *